(12) United States Patent
Haenel et al.

(10) Patent No.: US 8,010,659 B2
(45) Date of Patent: *Aug. 30, 2011

(54) EXECUTING RESOURCE CONSUMPTION CONTROL LIMITS

(75) Inventors: Walter Haenel, Holzgerlingen (DE); Stefan Hepper, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 449 days.

This patent is subject to a terminal disclaimer.

(21) Appl. No.: 12/236,697

(22) Filed: Sep. 24, 2008

(65) Prior Publication Data

US 2010/0077073 A1 Mar. 25, 2010

(51) Int. Cl.
*G06F 15/173* (2006.01)
(52) U.S. Cl. .................... 709/224; 709/225
(58) Field of Classification Search .......... 709/224, 709/217, 225; 726/27; 715/733, 781; 707/100, 707/5; 718/104
See application file for complete search history.

(56) References Cited

U.S. PATENT DOCUMENTS

| | | | |
|---|---|---|---|
| 2004/0054749 A1* | 3/2004 | Doyle et al. | 709/217 |
| 2007/0006318 A1* | 1/2007 | Allamaraju et al. | 726/27 |
| 2007/0136329 A1* | 6/2007 | Kussmaul et al. | 707/100 |
| 2009/0006971 A1* | 1/2009 | Guido et al. | 715/733 |
| 2009/0070457 A1* | 3/2009 | McKinney | 709/224 |
| 2009/0100372 A1* | 4/2009 | Lauridsen et al. | 715/781 |
| 2009/0313632 A1* | 12/2009 | Haenel et al. | 718/104 |
| 2010/0017385 A1* | 1/2010 | Wilcox et al. | 707/5 |

OTHER PUBLICATIONS

Oracle Application Server 10g High Availability; An Oracle White Paper Jan. 2004; 22 pages; Link < http://www.google.de/search?q=high+availability+portlets&ie=utf-8&oe=utf-8&aq=t&rls=org.mozilla:en-US:official&client=firefox-apage 18 > [retrieved from Internet Jun. 13, 2008].

Myong et al.; Switching to Enterprise-Scale Databases in Sun Java System Portal Server for Collaboration; 7 pages; < SUN http://developers.sun.com/portalserver/reference/techart/databases.html > [retrieved from Internet Jun. 13, 2008].

Abdelnur; JSR286 (Portlets 2.0), First Impressions; 4 pages; < http://tucu000.blogspot.com/2006/08/jsr286-portlets-20-first-impressions.html > [retrieved from internet Jun. 13, 2008].

* cited by examiner

*Primary Examiner* — Jungwon Chang
(74) *Attorney, Agent, or Firm* — Schmeiser, Olsen & Watts; Raymond Szeto

(57) ABSTRACT

A resource consumption control execution method and system. The method includes a computing system receiving a resource consumption rate limit value for a portlet/servlet and action data associated with the resource consumption rate limit value from a portlet/servlet. The computing system receives monitor data associated with a resource consumed by the portlet/servlet. The monitor data comprises a resource consumption rate value for the portlet/servlet. The computing system compares the resource consumption rate value to said resource consumption rate limit value. The computing system determines if the resource consumption rate value exceeds the resource consumption rate limit value. The computing system stores data indicating whether the resource consumption rate value exceeds the resource consumption rate limit value.

20 Claims, 10 Drawing Sheets

EXECUTING RESOURCE CONSUMPTION CONTROL LIMITS

FIELD OF THE INVENTION

The present invention relates to a method and associated system for executing resource consumption control limits and associated actions.

BACKGROUND OF THE INVENTION

Executing system control operations typically comprises an inefficient process with little flexibility. Accordingly, there exists a need in the art to overcome at least some of the deficiencies and limitations described herein above.

SUMMARY OF THE INVENTION

The present invention provides a resource consumption control execution method comprising:

first deploying, by a computing system, a first portlet/servlet;

receiving, by said computing system from said first portlet/servlet in response to said first deploying, a first resource consumption rate limit value for said first portlet/servlet and first action data associated with said first resource consumption rate limit value, wherein said first action data comprises a first action to be executed if said first resource consumption rate limit value is exceeded;

receiving, by said computing system in response to said first deploying, first monitor data associated with a first resource consumed by said first portlet/servlet during said first deploying, wherein said first monitor data comprises a resource consumption rate value for said first portlet/servlet during said first deploying;

comparing, by said computing system in response to said receiving said first monitor data, said resource consumption rate value to said first resource consumption rate limit value;

first determining, by said computing system based on said comparing said resource consumption rate value to said first resource consumption rate limit value, if said resource consumption rate value exceeds said first resource consumption rate limit value; and storing, by said computing system, results of said first determining.

The present invention advantageously provides a simple method and associated system capable of executing system control operations.

BRIEF DESCRIPTION OF THE DRAWINGS

FIG. 4 which includes

DETAILED DESCRIPTION OF THE INVENTION

Figure 1:
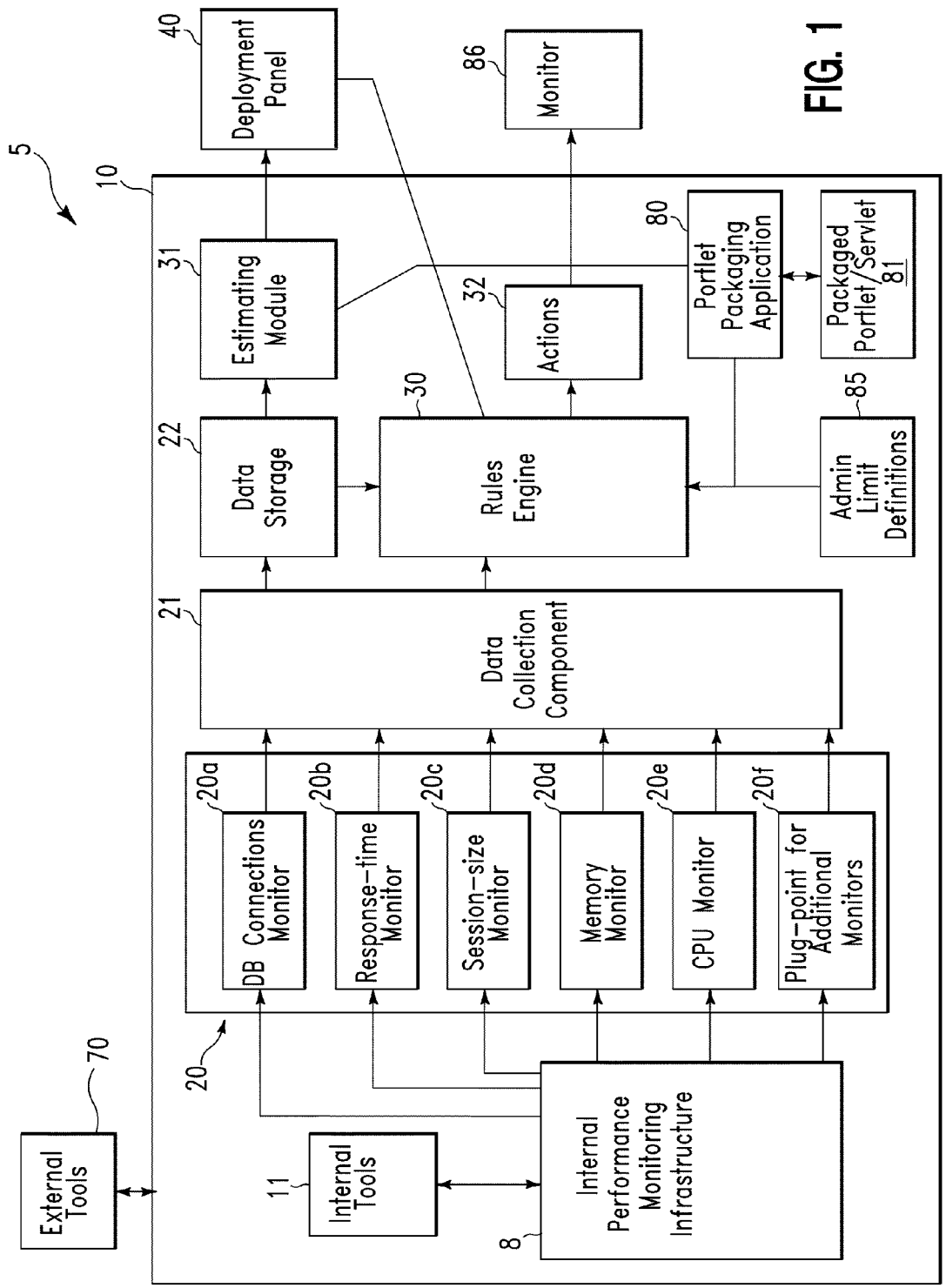
FIG. 1 illustrates a system for executing resource consumption control limits and associated actions for a servlet(s) or a portlet(s), in accordance with embodiments of the present invention.

FIG. 1 illustrates a system 5 for generating and executing resource consumption control limits and associated actions for a servlet(s) or a portlet(s), in accordance with embodiments of the present invention. A servlet is defined herein as a computer program that is executed on a server (e.g., Java code that is executed within a Web server environment). A portlet is defined herein as a Web-based component (i.e., from a portal) that processes requests and generates dynamic content (e.g., a specialized area of content within a Web page). System 2 executes an algorithm(s) that addresses unexpected resource (e.g., computer memory, central processing unit (CPU), computer connections, etc.) consumption of a portlet (or servlet) by measuring resource consumption values of the portlet (or servlet) and comparing the resource consumption values against a specified resource consumption value limit(s). Once the specified resource consumption value limit(s) is reached, specified actions are executed to prevent additional resource consumption by the portlet (or servlet). For example, the portlet (or servlet) may be disabled for a specified time period. Additionally, portlets may be relocated from one portal to another in order to better distribute a workload on all available systems. System 5 attaches the specified resource consumption value limit(s) and associated actions to the portlet (or servlet). The specified resource consumption value limit(s) and associated actions may be generated and attached to a portlet (or servlet) (e.g., stored in a deployment descriptor of the portlet (or servlet)) during a testing procedure in a staging environment. The specified resource consumption value limit(s) may be generated automatically by learning correct values during a training session. The specified resource consumption value limit(s) may then be attached to the portlet which in turn may be deployed in a production environment. The production environment will extract the resource limit values from the portlet and instruct internal or external measurement units to monitor the new portlet. If there are no resource limit values attached to the portlet or the resource limit values are not from the staging system, the portal may not deploy the portlet depending on global administrative setting. Additionally, a mean resource consumption value of all portlets may be used to determine if available system resources will be sufficient for the resulting system.

System 5 of FIG. 1 comprises:
1. A computing system 10 (e.g., an application server).
2. Resource monitors 20.
3. A data collection component 21.
4. A data storage system 22.
5. A rules engine 30 (e.g., a software application).
6. An estimating software module 31.
7. Actions 32.

8. A deployment panel 40.
9. Internal tools for performance monitoring/external performance monitoring software tools 70. These tools are used to analyze performance data retrieved from internal performance monitoring infrastructure 8.
10. A portlet packaging software application 80. Portlet packaging software application 80 accepts a portlet/servlet in a standard packaging (e.g., WAR file, EAR file, etc) and deploys the portlet/servlet onto computing system 10.
11. Packaged portlet/servlet 81 to be packaged with consumption data.
12. A monitor 86.
13. Administrator limit definitions 85.

Computing system 10 may comprise, inter alia, a personal computer, a laptop computer, a computer terminal, a server computer, etc. Computing system 10 may comprise a single computing apparatus or a plurality of computing apparatuses. Monitors 20 comprise various different monitors for each resource type. For example, a database connections monitor 20a, a response time monitor 20b, a session size monitor 20c, a memory monitor 20d, a CPU monitor 20e, a plug point for additional monitors 20f, etc. Monitors 20 are responsible for collecting performance relevant data (i.e., related to resources) and providing the data in a common format. Data collection component 21 is responsible for collecting data from all registered monitors 20. Additionally, data collection component 21 provides a history of data and stores data via data storage system 22. Data Storage system 22 stores actual and history of performance data for single portlets/servlets as well as for an entire runtime environment. Rules engine 30 retrieves data from data storage system 22 and compares the data to predefined rules and limit definitions in an action to be executed. Estimating software module 31 retrieves available data from data storage system 22 and provides an estimate for the overall system load in case a new portlet servlet is deployed. Actions 32 executes a programmable action (e.g., issuing an alert, sending an email, disabling an application, etc.). Deployment panel 40 visualizes a current system state and allows an estimations to be calculated if new resources are installed or consumption limits are modified. Portlet packaging application 80 accepts a portlet/servlet in a standard packaging (e.g., a WAR file or an EAR file) and deploys it onto the application server. This installs resource limits found in portlet/servlet package 81 onto the computing system 10. Portlet/servlet package 81 comprises definition files such as, inter alia, Web.xml, Portlet.XML, etc. Included in these application definition files are limits for resource consumption defined by the staging system. Administrator limit definitions 85 are generated by an administrator defining limits for resource consumption.

System 5 performs the following functions with respect to controlling resource consumption by a servlet(s) or a portlet(s):
1. Generating resource consumption limit values.
2. Deploying a portlet(s) or servlet(s) with the resource consumption limit values.
3. Monitoring the portlet(s) or servlet(s) comprising the resource consumption limit values.

In order to generate resource consumption limit values, a portlet is deployed (i.e., executed) to a staging environment (i.e. staging environment is equipped with tools (e.g., comprised by computing system 10) for measuring resource consumption). The tools may be integrated in a portal server or an application server. Resource consumption may include, inter alia:
1. Portlet memory consumption.
2. Portlet session size.
3. Portlet response time. Portlet response time includes an overall time that a portlet needs to answer to a request. This includes a waiting time for external resources such as, inter alia, databases and backend systems.
4. Portlet CPU consumption.

The tools (e.g., comprised by computing system 10) are instructed to measure resource consumption during a normal run under load and to learn maximum resource consumption values and mean resource consumption values. Measuring resource consumption may require runs of several days or weeks. Once measurements are completed, automated actions may be defined by an administrator. Automated actions may be executed when a specific resource consumption limit value, a specified percentage of a specific resource consumption limit value, or a combination of resource consumption limit values are reached. For example, a portlet could be taken out of service (i.e., disabled) if a memory limit is reached and the portal (i.e., comprising the portlet) is under heavy load. This may include an overall memory consumption and CPU load of the portal server. If the portal is not under heavy load, the reaction to crossing the memory limit may comprise lowering a priority of requests going to the portlet. Resource consumption limits may be generated by the following steps:
1. Deploy (enable) a portlet to a staging system. The staging system is set up to accept unprofiled portlets.
2. Generate tests to determine resource consumption (usage) in a production environment.
3. During the tests, a typical and maximum and mean resource consumption value is recorded.
4. An administrator may view the results from step 3, modify resource consumption limits for the portlet, and generate activities/actions to be executed at the resource consumption limit value and/or at a given percentage of the resource consumption limit value. For Example:
   A. A log entry (i.e., an action) may be created at 80% of a maximum resource consumption limit value.
   B. A message may be transmitted (i.e., an action) to an administrator at 90% of the maximum resource consumption limit value.
   C. The portlet may be deactivated (i.e., an action) if the maximum resource consumption limit value is reached.
5. Transmit the maximum resource consumption limit value and the actions back to the portlet for storage.

A portlet(s) or servlet(s) with the generated resource consumption limit values may be deployed by the following steps:
1. Start a deployment of a portlet in a production system.
2. Activate a resource limit checking process via deployment panel 40.
3. Estimating module 31 calculates a new resource load for computing system 10. The new resource load is calculated from an average system load and values provided in portlet limit definitions from packaging application 80.
   A. If the new resource load exceeds capabilities of system 5, maximum resource values for the portlet are reduced and proposed to an administrator.
   B. If available resources are too low, system 5 proposes to the administrator that the portlet should not be deployed.
4. An outcome of the procedure described in step 3 is presented to the Administrator which allows the administrator to modify the limit definitions as well as cancel a deployment of the portlet.
5. If the administrator accepts the results, the portlet will be deployed with the new limits.

A portlet(s) or servlet(s) with the generated resource consumption limit values may be monitored during deployment by the following steps:

1. Monitors 20 monitor critical system 5 resources. Results of from the monitoring are displayed via external tools 70 or internal tools 11.
2. The results from monitors 20 are transmitted to data collection component 21. Data collection component 21 collects all data (i.e., from monitors 20) and transmits the data to the data storage 22. Data storage 22 stores actual measurement data and a summary of historical data (e.g., mean values per hour).
3. The actual measurement data is additionally transmitted to rules engine 30. Rules engine 30 extracts resource limits from the portlet database.

A. If resource limits are available, rules engine 30 compares current values with administrator defined limits 85 and limits in application definition files (from packaging application 80).

B. If the resource limits are exceeded, actions component 32 is enabled to execute defined actions.

The following examples illustrate implementation examples for controlling resource consumption by a servlet(s) or a portlet(s).

Example 1

Example 1 illustrates sample encoding of limits in a portlet WAR file. A portlet WAR file comprises a standard packaging for a portlet holding several metadata files (e.g., a portlet xml file). The metadata file may hold custom parameters, which may be used to transport resource consumption values. A signing process applied to the war file may be used to assure, that the values may not be modified afterwards. Example 1 illustrates that a mean session memory consumption of the portlet for a single session is 200 k and a maximum consumption is 500 k. CPU and response time consumption values are added to illustrate that multiple values could be used. In example 1, the resource consumption templateset may indicate that a specific templateset should be used to control the resource consumption of a portlet.

```
<?xml version="1.0" encoding="UTF-8"?>
<portlet-app xmlns="http://java.sun.com/xml/ns/portlet/portlet-
app_1_0.xsd" version="1.0"
xmlns:xsi="http://www.w3.org/2001/XMLSchema-instance"
xsi:schemaLocation="http://java.sun.com/xml/ns/portlet/portlet-
app_1_0.xsd">
  <portlet>
    <description xml:lang="EN">Very important business application
    portlet</description>
    <portlet-name>BusinessApplicationPortlet</portlet-name>
    <display-name xml:lang="EN">Business Application
    Portlet</display-name>
    <portlet-class>com.ibm.samples.portlet.business.Appliction.class</
    portlet-class>
    <init-param>
      <name>ibm.session.mem.upper-limit</name>
      <value>500k</value>
    </init-param>
    <init-param>
      <name>ibm.session.mem.median</name>
      <value>200k</value>
    </init-param>
    <init-param>
      <name>ibm.cpu.upper-limit</name>
      <value>500p</value>
    </init-param>
    <init-param>
```

-continued

```
      <name>ibm.cpu.median</name>
      <value>100p</value>
    </init-param>
    <init-param>
      <name>ibm.response-time.upper-limit</name>
      <value>5s</value>
    </init-param>
    <init-param>
      <name>ibm.response-time.median</name>
      <value>1s</value>
    </init-param>
    <init-param>
      <name>ibm.resource.consumption.templateset</name>
      <value>high available</value>
    </init-param>
    <expiration-cache>-1</expiration-cache>
    <supports>
      <mime-type>text/html</mime-type>
      <portlet-mode>config</portlet-mode>
      <portlet-mode>edit</portlet-mode>
      <portlet-mode>help</portlet-mode>
    </supports>
    <supported-locale>EN</supported-locale>
    <portlet-info>
      <title>Business Application</title>
      <short-title>Business App</short-title>
    </portlet-info>
  </portlet>
</portlet-app>
```

Example 2

Example 2 illustrates an example of a templateset. The templateset with the name high available defines three rules associated with how to react to excessive memory consumption of the portlet:

1. Rule 1 will trigger at 100% and disable the portlet to prevent harm to the overall portal system.
2. Rule 2 will trigger at 90% and send a message to the operator.
3. Rule 3 will trigger at 80% of the memory limit and create an entry in the log file due to the excessive memory consumption.

```
<templateset name = "high available">
  <ruleTemplate name = "memConsumption" Id="1" >
    <trigger> memory_consumption>=100%
    ${ibm.session.mem.upper-limit}
</trigger>
    <default> memory_consumption >= 400k </default>
    <action method=stopPortlet>
      <text>Memory Cons. of portlet ${portletname} exceeds
      1000 % </text>
    </action>
  </rule>
  <ruleTemplate name = "memConsumption" Id="2" >
    <trigger> memory_consumption>=90%
    ${ibm.session.mem.upper-limit}
</trigger>
    <default> memory_consumption >= 300k </default>
    <action method=sendMessage >
      <text>Memory Consump. of portlet ${portletname}
      exceeds 90 % </text>
    </action>
  </rule>
  <ruleTemplate name = "memConsumption" Id="3" >
    <trigger> memory_consumption>= 80%
    ${ibm.session.mem.upper-limit}
</trigger>
    <default> memory_consumption >= 200k </default>
    <action method=logMessage >
      <text>Memory Consump. of portlet ${portletname}
```

```
    exceeds 80 % </text>
   </action>
  </rule>
</templateset>
```

Example 3

Example 3 illustrates a modified version of example 1. In contrast to example 1, the resource consumption rules are included in the file itself (i.e., are not represented by a reference).

```
<?xml version="1.0" encoding="UTF-8"?>
<portlet-app xmlns="http://java.sun.com/xml/ns/portlet/portlet-
app_1_0.xsd" version="1.0"
xmlns:xsi="http://www.w3.org/2001/XMLSchema-instance"
xsi:schemaLocation="http://java.sun.com/xml/ns/portlet/portlet-
app_1_0.xsd">
 <portlet>
  <description xml:lang="EN">Very important business application
  portlet</description>
  <portlet-name>BusinessApplicationPortlet</portlet-name>
  <display-name xml:lang="EN">Business Application
  Portlet</display-name>
  <portlet-class>com.ibm.samples.portlet.business.Appliction.class</
  portlet-class>
  <init-param>
    <name>ibm.session.mem.upper-limit</name>
    <value>500k</value>
  </init-param>
  <init-param>
    <name>ibm.session.mem.median</name>
    <value>200k</value>
  </init-param>
  <init-param>
    <name>ibm.cpu.upper-limit</name>
    <value>500p</value>
  </init-param>
  <init-param>
    <name>ibm.cpu.median</name>
    <value>100p</value>
  </init-param>
  <init-param>
    <name>ibm.response-time.upper-limit</name>
    <value>5s</value>
  </init-param>
  <init-param>
    <name>ibm.response-time.median</name>
    <value>1s</value>
  </init-param>
  <init-param>
    <name>ibm.resource.consumption.ruletemplate.1</name>
    <value> name = "memConsumption" Id="3</value>
  </init-param>
  <init-param>
    <name>ibm.resource.consumption.ruletemplate.1.trigger</name>
    <value> memory_consumption>= 80%
    ${ibm.session.mem.upper-limit} </value>
  </init-param>
  <init-param>
    <name>ibm.resource.consumption.ruletemplate.1.default</name>
    <value> memory_consumption >= 200k </value>
  </init-param>
  <init-param>
    <name>ibm.resource.consumption.ruletemplate.1.method</name>
    <value> logMessage </value>
  </init-param>
  <init-param>
    <name>ibm.resource.consumption.ruletemplate.1.method.text</name>
    <value> Memory Consump. of portlet ${portletname} exceeds 80 %
    </value>
  </init-param>
  <expiration-cache>-1</expiration-cache>
  <supports>
    <mime-type>text/html</mime-type>
    <portlet-mode>config</portlet-mode>
    <portlet-mode>edit</portlet-mode>
    <portlet-mode>help</portlet-mode>
  </supports>
  <supported-locale>EN</supported-locale>
  <portlet-info>
    <title>Business Application</title>
    <short-title>Business App</short-title>
  </portlet-info>
 </portlet>
</portlet-app>
```

Figure 2:
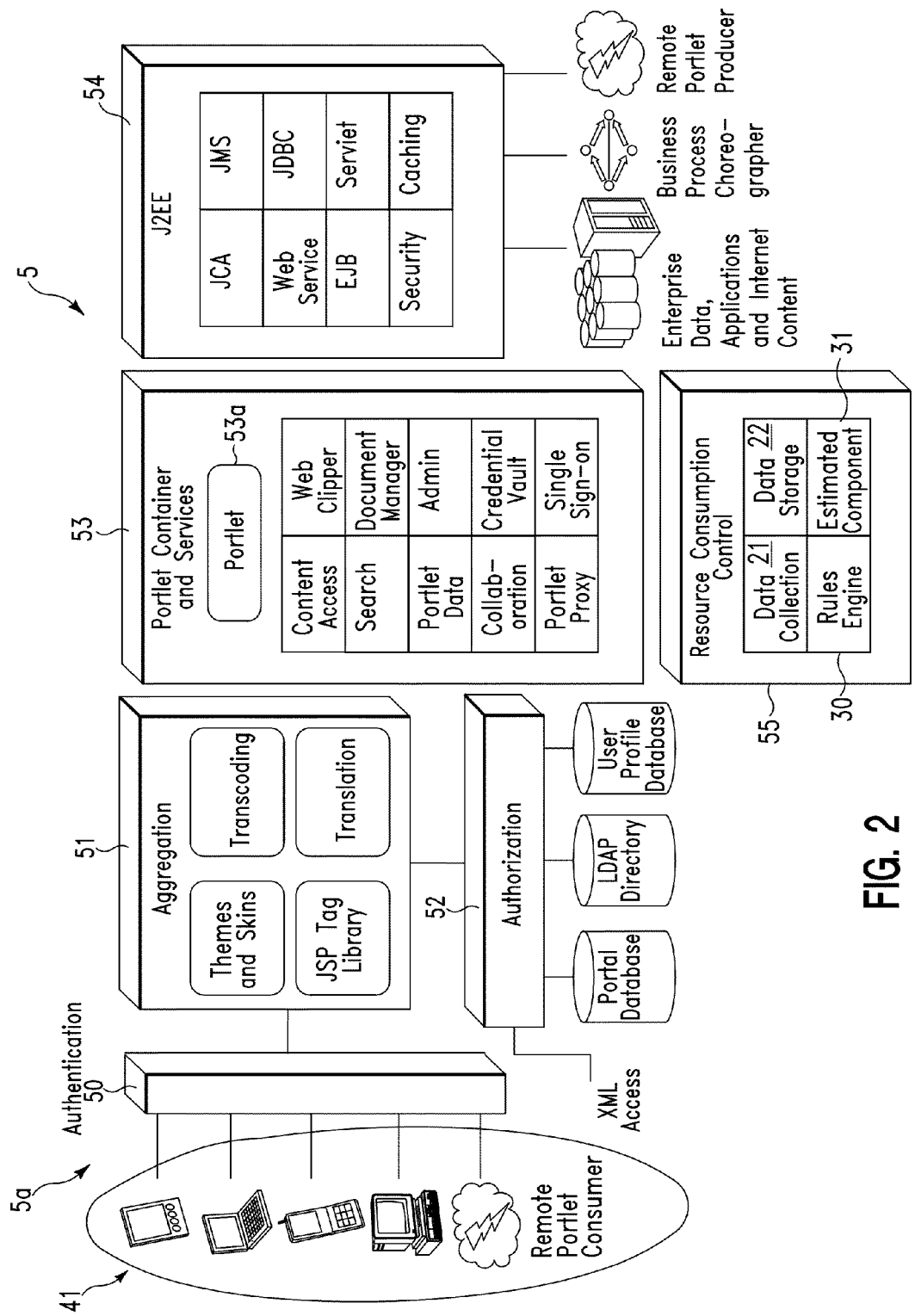
FIG. 2 illustrates a system depicting a portal example for implementing the system of FIG. 1, in accordance with embodiments of the present invention.

FIG. 2 illustrates a system 5a depicting a portal example for implementing system 5 of FIG. 1 for controlling resource consumption by a portlet 53a, in accordance with embodiments of the present invention. System 5a comprises:

1. End devices 41.
2. An authentication component 50.
3. Page aggregation 51.
4. An authorization component 52.
5. A portlet container & services 53.
6. A Java EE
7. A resource consumption control module 55.

End devices 50 comprise devices (e.g., computers, telephones, etc) that are running browsers for accessing a portal. Authentication component 50 authenticates an incoming user. Page aggregation 51 aggregates different artifacts and fragments (e.g., themes and skins, transcoding, translation, JSP library, etc) into a single page and determines which portlets 53a are on a current page. Authorization component 52 determines resources that a current user may access. Portlet container & services 53 comprises a runtime environment for portal that runs the portlets 53a. Java EE 54 comprises additional services (e.g., JCA, JMS, Web services, JDBC, etc) provided by a Java EE runtime. Resource consumption control module 55 comprises data collection component 21, data storage system 22, rules engine 30 (e.g., a software application), and estimating software module 31 of FIG. 1. Resource consumption control module 55 interacts with portlet container and services 53 in order to monitor portlets 53a, complete page performance numbers, and overall system parameters such as CPU load or memory consumption.

Figure 3A:
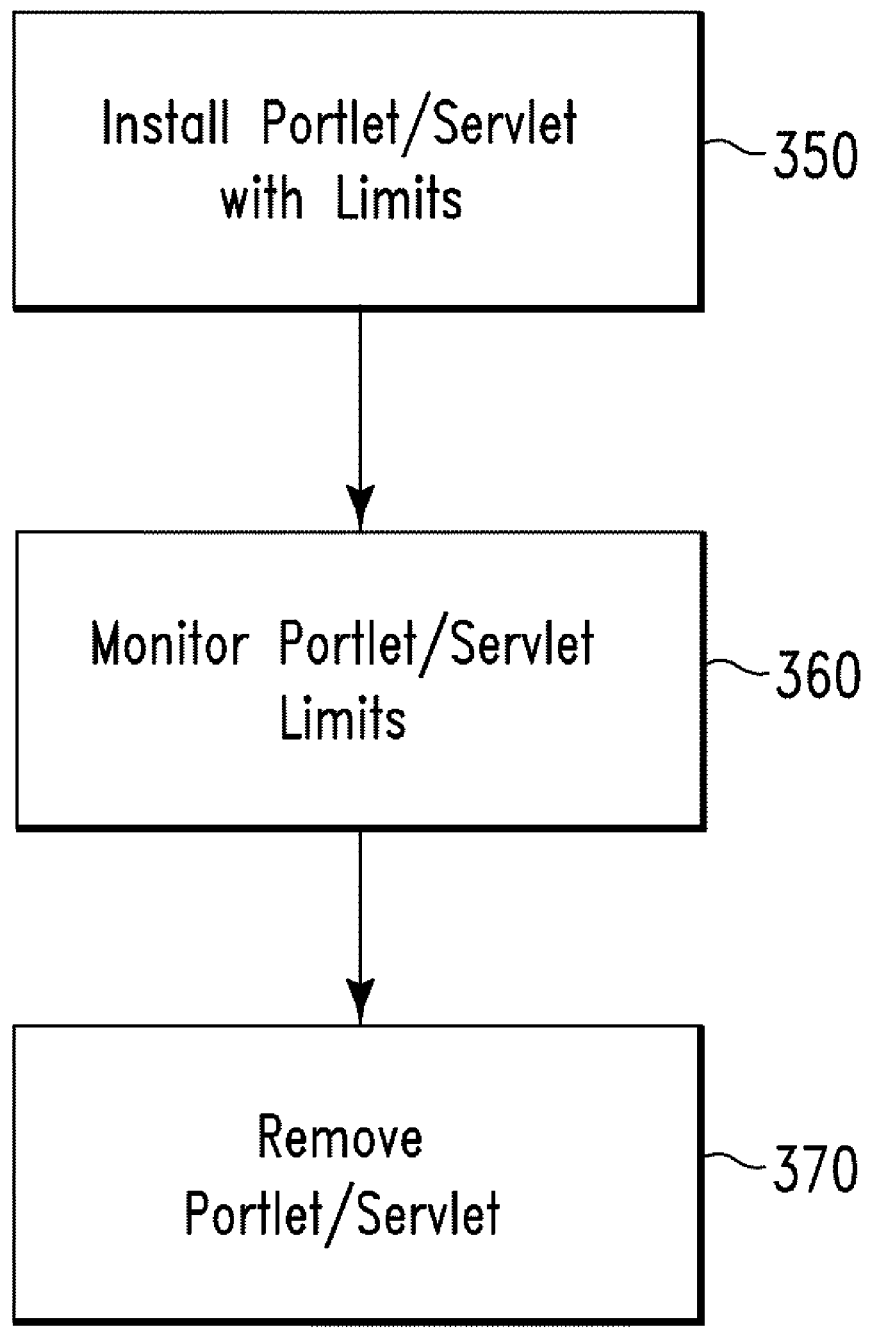
FIG. 3A illustrates an overall lifecycle of a servlet(s) or a portlet(s) in a server environment, in accordance with embodiments of the present invention.

FIG. 3A illustrates an overall lifecycle of a servlet(s) or a portlet(s) in a server environment, in accordance with embodiments of the present invention. In step 350, a computing system (e.g., computing system 10 of FIG. 1) deploys a portlet (or servlet) with limits. During step 350, the portlet (or servlet) is brought into a runtime system (e.g., a portal or application server). Runtime limits are generated and registered into the runtime system and the portlet (or servlet) is activated. In step 360, the portlet (or servlet) limits are monitored. During step 360, the portlet (or servlet) receives customer requests and respond to the customer requests. Additionally, resource consumption of the portlet (or servlet) will be monitored and compared to registered limits. If the registered limits are exceeded, specific actions are taken. In step 370, the portlet (or servlet) is removed from the runtime environment and the lifecycle ends.

Figure 3B:
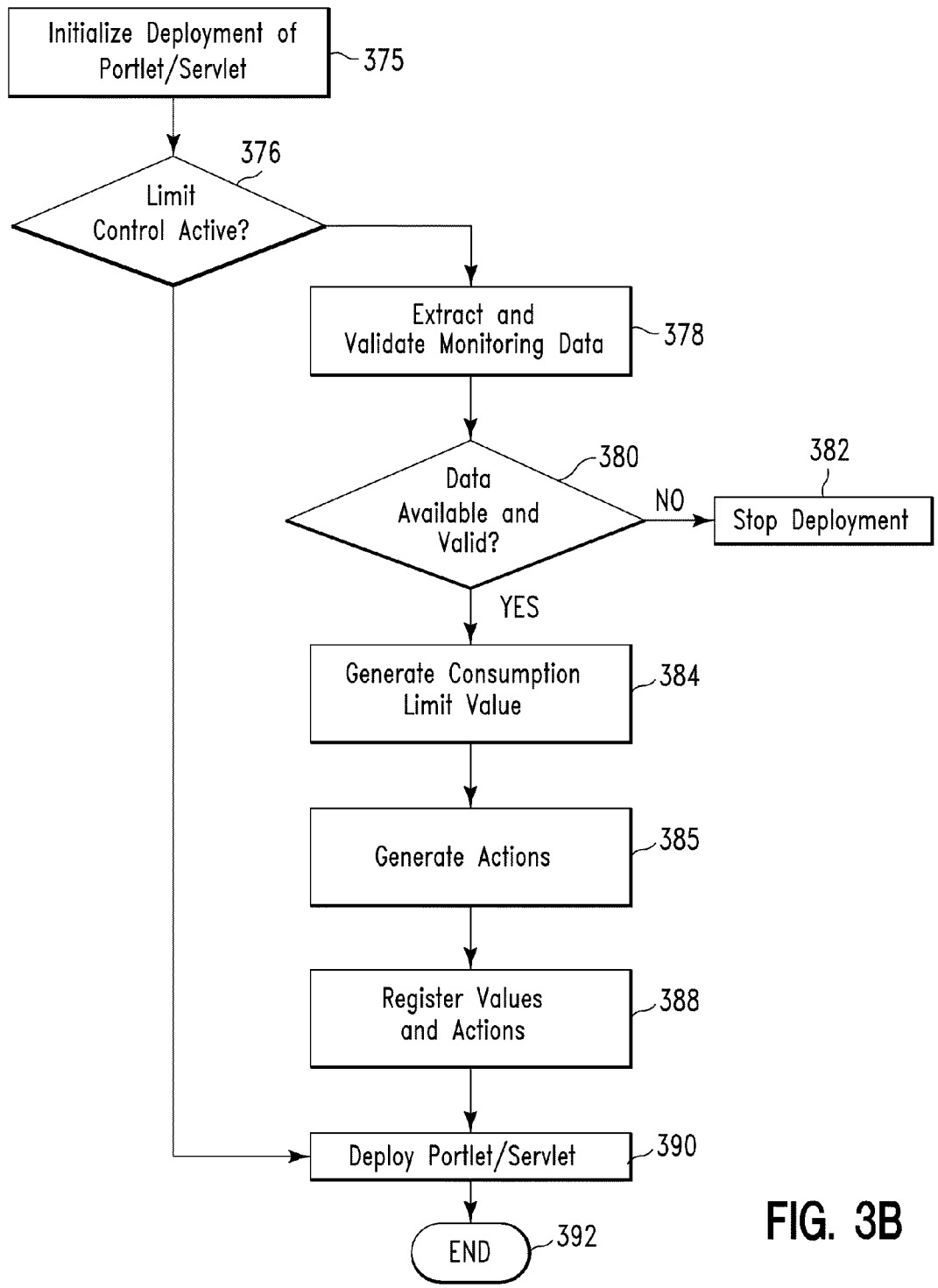
FIG. 3B illustrates a flowchart detailing a first step in the algorithm of FIG. 3A, in accordance with embodiments of the present invention.

FIG. 3B illustrates a flowchart detailing step 350 in the algorithm of FIG. 3A, in accordance with embodiments of the present invention. In step 375, the portlet (or servlet) is deployed. The deployment is initialized by an administrator or a software tool using a user interface or API. In step 376, it is determined if a resource limit control has been activated. If in step 376, it is determined that the resource limit control has not been activated then in step 390, the portlet or servlet is deployed. If in step 376, it is determined that the resource limit control has been activated then in step 378, resource consumption data is extracted from the portlet or servlet and validated for correctness. For a portlet or servlet, the consumption data may be located in porlet.xml. The content of a portlet or servlet packaging may be secured against modification by a signature on the packaging. Checking the signature will determine that the data was not modified and that an originator of the data is correct. For example, this check could assure that the portlet or servlet was tested on a correct staging system. In step 380, it is determined if the resource consumption data is available and valid. If in step 380, it is determined that the resource consumption data is not available and valid then in step 382, a deployment of the portlet or servlet is disabled and a reason for disabling the deployment is returned. If in step 380, it is determined that the resource consumption data is available and valid then in step 384, consumption limit data or values for the portlet or servlet are calculated by a system using resource consumption data, information on the actual system load, and administrator provided input. In step 385, action rules are calculated from the consumption limits generated in step 384. In step 388, the limit values and the action rules are registered in a rules engine. In step 390, the portlet or servlet is deployed and the process is terminated in step 392.

Figure 3C:
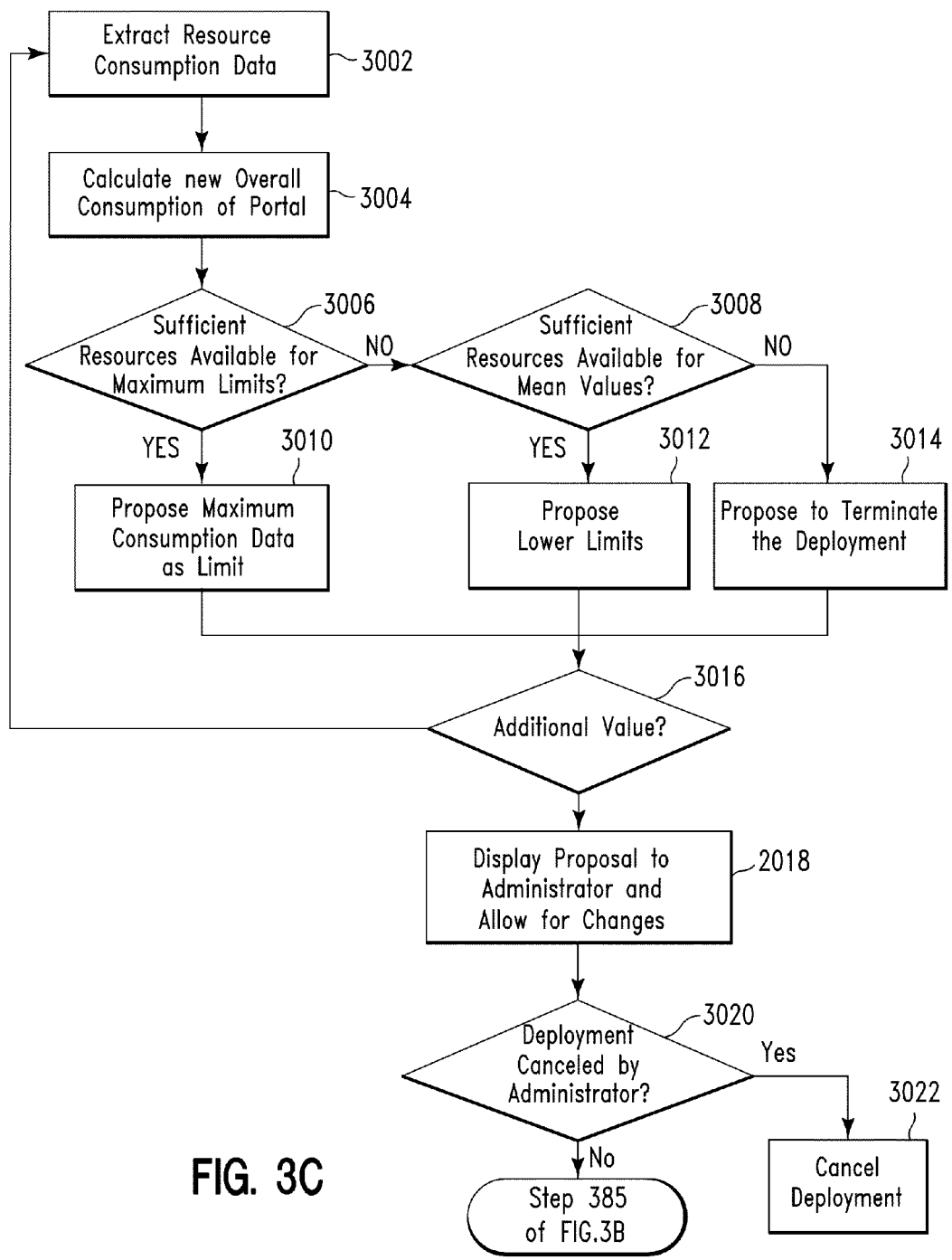
FIG. 3C illustrates a flowchart detailing a first step in the algorithm of FIG. 3B, in accordance with embodiments of the present invention.

FIG. 3C illustrates a flowchart detailing a step 384 in the algorithm of FIG. 3B, in accordance with embodiments of the present invention. In step 3002, resource consumption data is extracted from the portlet or servlet. In step 3004, estimating module 31 (i.e., of FIG. 1) calculates new resource estimates (i.e., typically mean and max values from the input) using mean and maximum resource consumption data as well as data on the current load of the system (e.g., CPU usage, memory usage, amount of users, etc) coming from the data storage 22 of FIG. 1. In step 3006, it is determined if sufficient resources are available for the maximum limits. If in step 3006, it is determined that sufficient resources are available for the maximum limits, then in step 3010, the maximum consumption data is proposed as the limit and step 3016 is executed as described, infra. If in step 3006, it is determined that sufficient resources are not available for the maximum limits, then in step 3008 it is determined if sufficient resources are available to cover the mean resource consumption value. If in step 3008, it is determined that sufficient resources are available to cover the mean resource consumption value then in step 3012, a lower limit for the mean resource consumption value is proposed and step 3016 is executed as described, infra. If in step 3008, it is determined that sufficient resources are not available to cover the mean resource consumption value then in step 3014, deployment of the portlet or servlet is disabled and in step 3016 it is determined if any additional resource consumption value pairs (max and mean) are located. If in step 3016 it is determined that additional resource consumption value pairs (max and mean) are located then step 3002 is repeated. If in step 3016, it is determined that additional resource consumption value pairs (max and mean) are not located then in step 3018, all calculated proposals are displayed for an administrator and the administrator is allowed to change the proposed values. In step 3020, it is determined if the administrator has canceled deployment of the porlet or servlet. If in step 3020, it is determined that the administrator has issued a command for canceling deployment of the porlet or servlet then in step 3022, deployment of the portlet or servlet is canceled. If in step 3020, it is determined that the administrator has not issued a command for canceling deployment of the porlet or servlet then step 385 of FIG. 3B is executed as described, supra.

Figure 3D:
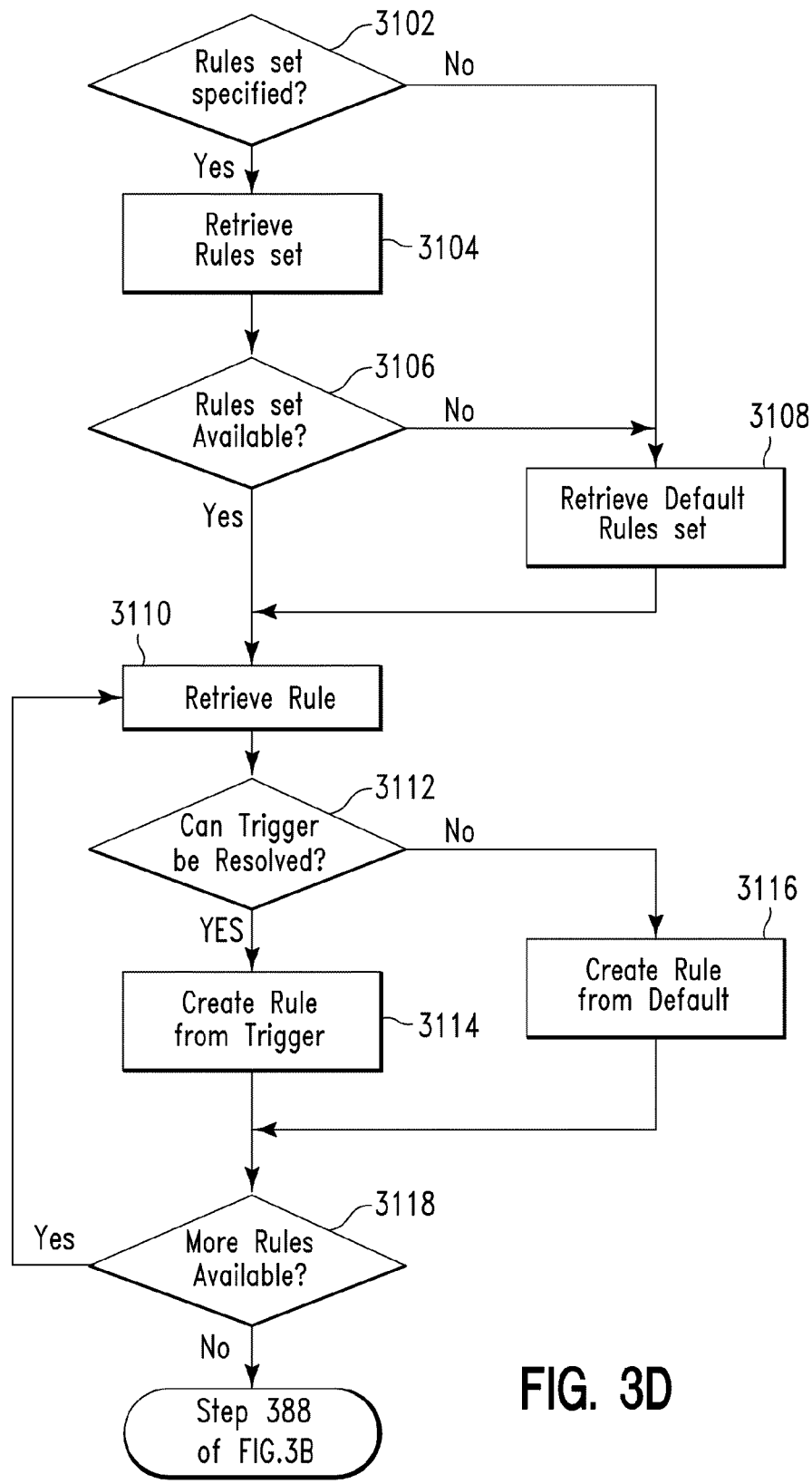
FIG. 3D illustrates a flowchart detailing a second step in the algorithm of FIG. 3B, in accordance with embodiments of the present invention.

FIG. 3D illustrates a flowchart detailing step 385 in the algorithm of FIG. 3B, in accordance with embodiments of the present invention. In step 3102, it is determined if a template/rules set has been specified in the portlet or servlet package.

If in step 3102, it is determined that a template/rules set has been specified in the portlet or servlet package then in step 3104, an attempt to retrieve the template/rules is executed. In step 3106, it is determined if the template/rules set is available. If in step 3106, it is determined that the template/rules set is available then step 3110 is executed as described, infra. If in step 3106, it is determined that the template/rules set is not available then in step 3108, a default template/rules set is retrieved and step 3110 is executed as described, infra.

If in step 3102, it is determined that a template/rules set has not been specified in the portlet or servlet package then step 3108 is executed as described, supra.

In step 3110, a next rule is retrieved from the template/rules set. The retrieval may comprise a sequential order or may be ordered by priority which would be an additional value in the rule set definition. In step 3112, it is determined if needed information to resolve variables in the rules template is retrieved from calculated limits (i.e., trigger resolved). If in step 3112, it is determined that the needed information to resolve variables in the rules template is retrieved from calculated limits (i.e., trigger resolved) then in step 3114, a rule is generated by replacing the variable values in the trigger and step 3118 is executed as described, infra. If in step 3112, it is determined that the needed information to resolve variables in the rules template is not retrieved from calculated limits (i.e., trigger resolved) then in step 3116, the default is taken as a rule and in step 3118, it is determined if more template/rules are available. If in step 3118, it is determined that more template/rules are available then step 3110 is repeated. If in step 3118, it is determined that no more template/rules are available then step 388 of FIG. 3B is executed as described, supra.

Figure 3E:
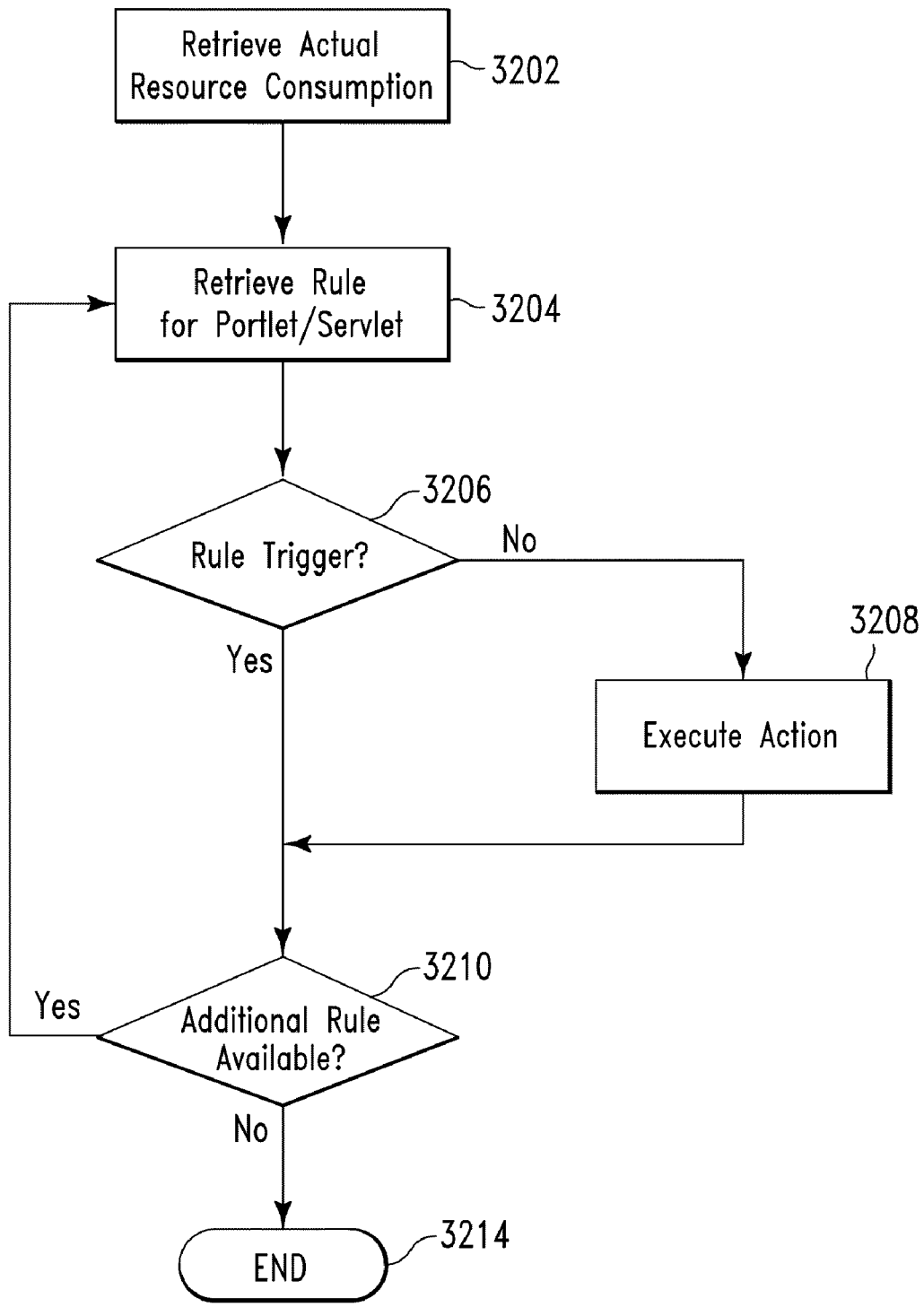
FIG. 3E illustrates a flowchart describing an algorithm used during a run time of the system of FIG. 1, in accordance with embodiments of the present invention.

FIG. 3E illustrates a flowchart detailing step 360 in the algorithm of FIG. 3A, in accordance with embodiments of the present invention. In step 3202, an actual resource consumption value is retrieved. Step 3202 is triggered by a call to the portlet or servlet or by a schedule, which may activate this function every 10 seconds. The actual resource consumption for the portlet or servlet is retrieved from data storage and fed into the rules engine 30 (of FIG. 1) together with portlet or servlet id. In step 3204, the rules engine retrieves a next rule registered for the portlet or servlet. In step 3206, it is determined if the rule for the portlet or servlet triggers an action. If in step 3206, it is determined that the rule for the portlet or servlet triggers an action then in step 3208 the action is executed and step 3210 is executed as describe, infra. If in step 3206, it is determined that the rule for the portlet or servlet does not trigger an action then in step 3210, it is determined if another rule is available for the portlet or servlet. If in step 3210, it is determined that another rule is available for the portlet or servlet then step 3204 is repeated. If in step 3210, it is determined that another rule is not available for the portlet or servlet then the process is terminated in step 3214.

Figure 4A:
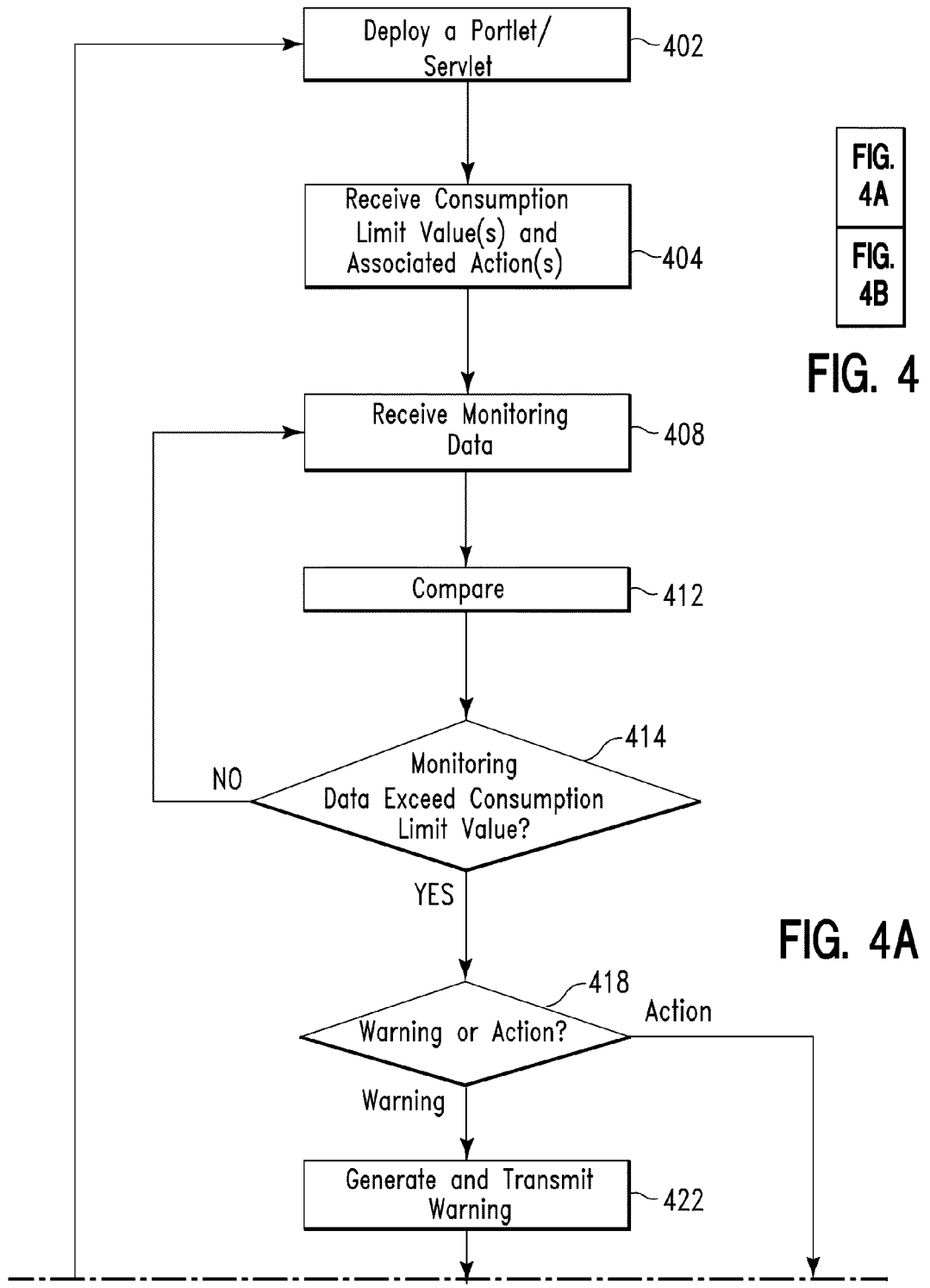
FIGS. 4A and 4B illustrates a flowchart describing an algorithm used by the system of FIG. 1 for executing resource consumption limit values and associated actions, in accordance with embodiments of the present invention.
Figure 4B:
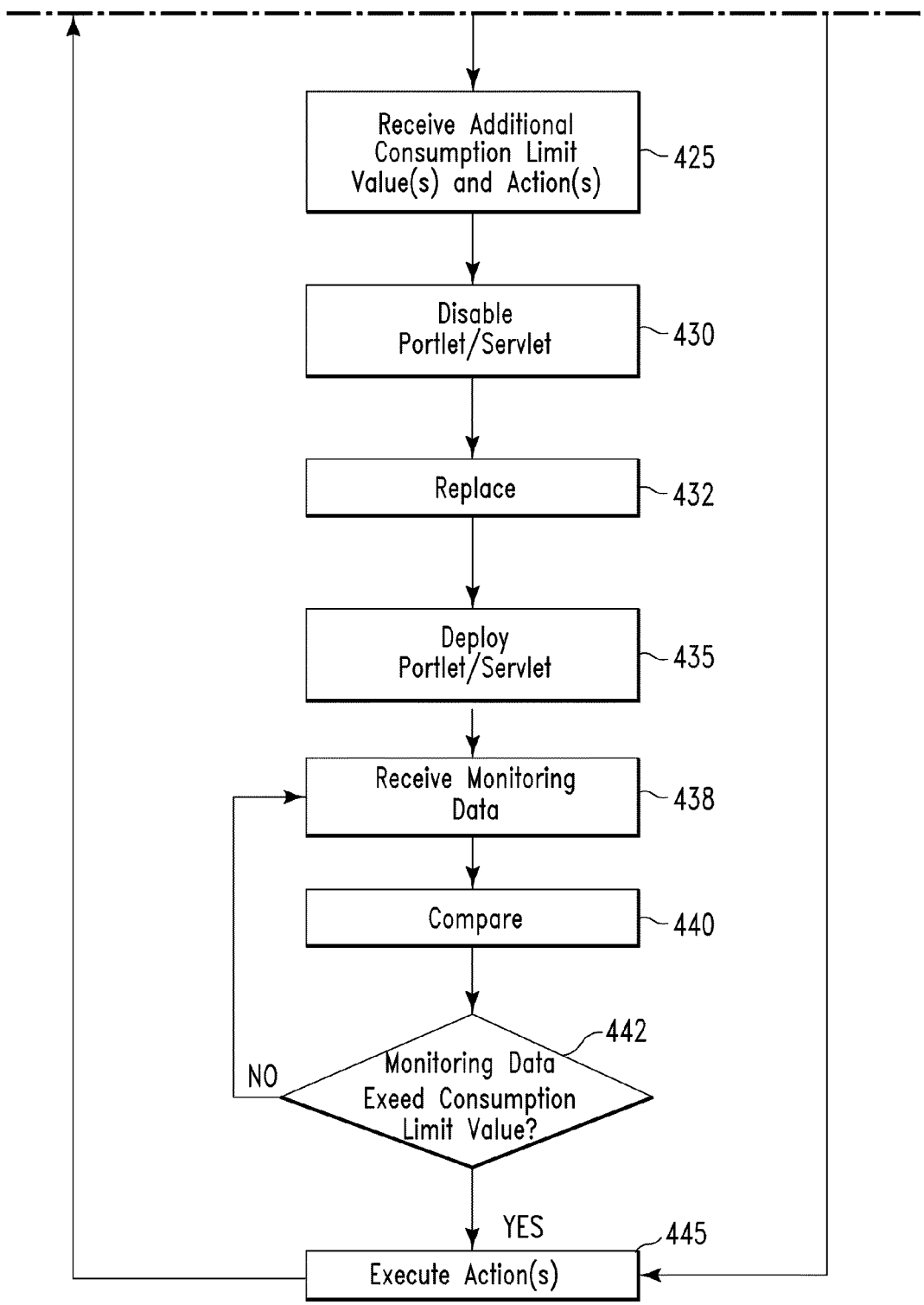

FIG. 4 which includes FIGS. 4A and 4B illustrates a flowchart describing an algorithm used by system 5 of FIG. 1 for executing resource consumption limit values and associated actions, in accordance with embodiments of the present invention. In step 402, a computing system (e.g., computing system 10 of FIG. 1) enables a portlet(s) (or servlet(s)). In step 404, the computing system (i.e., in response to step 402) receives a resource consumption rate limit value for the portlet(s) (or servlet(s)) and action data associated the resource consumption rate limit value. The action data (i.e., associated with resource consumption rate limit value) comprises actions to be executed if the resource consumption rate limit value is exceeded by (or less than) a resource consumption rate value for the portlet(s) (or servlet(s)). Additionally in step 404, a specified percentage value(s) and associated action(s) may be received by the computing system. The associated actions (i.e., associated with the specified percentage value(s)) comprise actions to be executed if the specified percentage value(s) is exceeded by a resource consumption rate value. In step 408, monitor data associated with a resource consumed by the portlet(s) (or servlet(s)) is received by the computing system. The monitor data comprises the resource consumption rate value for the portlet(s) (or servlet(s)). In step 412, the computing system (i.e., in response to step 408) compares the resource consumption rate value to the resource consumption rate limit value (and/or compares the resource consumption rate value to the specified percentage value(s)). In step 414, it is determined if the resource consumption rate value exceeds (or is less than) the first resource consumption rate limit value (or the specified percentage value(s)). If in step 414 it is determined that the resource consumption rate value does not exceed the first resource consumption rate limit value then step 408 is repeated to continue to monitor the resource consumption rate value for the portlet (or servlet). Alternatively or additionally, if in step 414 it is determined that the resource consumption rate value does not exceed the first resource consumption rate limit value then a message indicating a percentage difference between the resource consumption rate value and said resource consumption rate limit value may be generated and transmitted to an administrator of system 5.

If in step 414 it is determined that the resource consumption rate value exceeds the resource consumption rate limit value (or the specified percentage value(s)) then in step 418, it is determined if a warning should be generated or an action(s) should be executed. If in step 414 it is determined that an action(s) should be executed then in step 432, an action(s) (i.e., associated with the resource consumption rate limit values or the specified percentage value(s)) received in step 404) is executed. For example, the portlet(s) (or servlet(s)) may be disabled. If in step 414 it is determined that a warning should be generated then in step 422, the computing system generates a warning (i.e., indicating that the resource consumption rate value exceeds the resource consumption rate limit value or the specified percentage value(s)) and transmits the warning to an administrator. In step 425 (i.e., in response to the warning), the computing system receives (from the administrator) additional resource consumption rate limit values (and/or additional percentage value(s) of the additional resource consumption rate limit values) and additional associated action data. The additional resource consumption rate limit values (and/or additional percentage value(s)) may be greater than the original resource consumption rate limit value(s) (and/or the specified percentage value(s)) received in step 404. Additionally, the additional resource consumption rate limit values may be greater than the resource consumption rate value from step 408. The additional action data comprises second actions to be executed if the additional resource consumption rate limit value(s) is exceeded by the resource consumption rate value of the portlet(s) (or servlet(s)). In step 430, the portlet(s) (or servlet(s)) is disabled. In step 432, the resource consumption rate limit value for the portlet(s) (or servlet(s)), the specified percentage value(s), and the action data received in step 404 is replaced with the additional resource consumption rate limit values, the additional percentage value(s), and the additional associated action data received in step 425. In step 435, the portlet(s) (or servlet(s)) is enabled (again). In step 438, monitor data associated with the resource consumed by the portlet(s) (or servlet(s)) is received by the computing system. The monitor data comprises an additional resource consumption rate value for the portlet(s) (or servlet(s)) after step 435 has been executed. In step 440, the computing system (i.e., in response to step 438) compares the additional resource consumption rate value (received in step 438) to the additional resource consumption rate limit value (received in step 425) and/or compares the additional resource consumption rate value to the additional specified percentage value(s)). In step 442, it is determined if the additional resource consumption rate value (received in step 438) exceeds (or is less than) the additional resource consumption rate limit value (or the specified percentage value(s)) received in step 425. If in step 442, it is determined that the additional resource consumption rate value does not exceed the additional resource consumption rate limit value then step 438 is repeated to continue to monitor the additional resource consumption rate value for the portlet(s) (or servlet(s)). Alternatively or additionally, if in step 442 it is determined that the additional resource consumption rate value does not exceed the additional resource consumption rate limit value then a message indicating a percentage difference between the additional resource consumption rate value and said additional resource consumption rate limit value may be generated and transmitted to an administrator of system 5.

If in step 442 it is determined that the additional resource consumption rate value exceeds the additional resource consumption rate limit value (or the additional percentage value(s)) then in step 445 an action(s) (i.e., associated with the additional resource consumption rate limit values or the additional percentage value(s)) received in step 425) is executed. For example, the portlet(s) (or servlet(s)) may be disabled. The process described with respect to the algorithm of FIG. 4 may be repeated for multiple portlet(s) (or servlet(s)). For example, additional portlet(s) (or servlet(s)) may be enabled and monitored such that combinations of resource consumption rate limit values and/or the specified percentage value(s)) for the multiple portlet(s) (or servlet(s)) may be compared to combinations of consumption rate limit values for the multiple portlet(s) (or servlet(s)) and associated actions or warnings may be executed based on the comparisons in accordance with the algorithm of FIG. 4.

Figure 5:
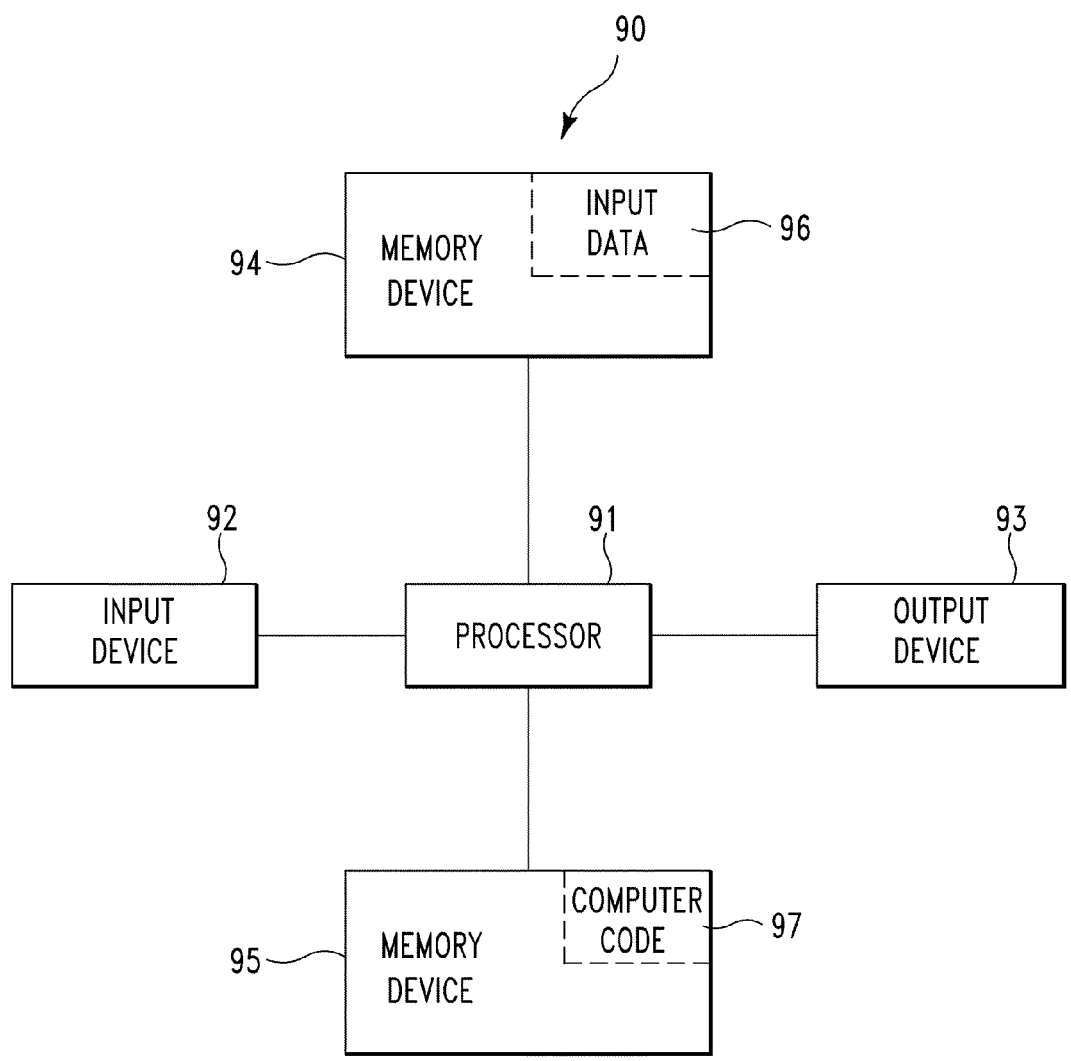
FIG. 5 illustrates a computer apparatus used for executing resource consumption control limits and associated actions for a servlet(s) or a portlet(s), in accordance with embodiments of the present invention.

FIG. 5 illustrates a computer apparatus 90 (e.g., computing system 10 of FIG. 1) used for executing resource consumption limit values and associated actions, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3 and 4) for executing resource consumption limit values and associated actions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 3 and 4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to execute resource consumption limit values and associated actions. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for executing resource consumption limit values and associated actions. In another embodiment, the invention provides a business method that performs the process steps of the invention on a subscription, advertising, and/or fee basis. That is, a service provider, such as a Solution Integrator, could offer to execute resource consumption limit values and associated actions. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A resource consumption control execution method comprising:
    first deploying, by a computing system, a first portlet/servlet;
    receiving, by said computing system from said first portlet/servlet in response to said first deploying, a first resource consumption rate limit value for said first portlet/servlet and first action data associated with said first resource consumption rate limit value, wherein said first action data comprises a first action to be executed if said first resource consumption rate limit value is exceeded;
    receiving, by said computing system in response to said first deploying, first monitor data associated with a first resource consumed by said first portlet/servlet during said first deploying, wherein said first monitor data comprises a resource consumption rate value for said first portlet/servlet during said first deploying;
    comparing, by said computing system in response to said receiving said first monitor data, said resource consumption rate value to said first resource consumption rate limit value;
    first determining, by said computing system based on said comparing said resource consumption rate value to said first resource consumption rate limit value, that said resource consumption rate value exceeds said first resource consumption rate limit value; and
    storing, by said computing system, results of said first determining;
    executing, by said computing system, said first action, wherein said executing said first action comprises transmitting a warning message to an administrator, and wherein said warning message indicates that said resource consumption rate value exceeds said first resource consumption rate limit value;
    receiving, by said computing system from said administrator in response to said warning message, a second resource consumption rate limit value and second action data, wherein said second resource consumption rate limit value is greater than said first resource consumption rate limit value and said resource consumption rate value, and wherein said second action data comprises a second action to be executed if said second resource consumption rate limit value is exceeded by a first resource consumption rate value for said first portlet/servlet during said second deploying;
    disabling, by said computing system, said first portlet/servlet;
    replacing, by said computing system, said first resource consumption rate limit value with said second resource consumption rate limit value;
    second deploying, by said computing system in response to said replacing, said first portlet/servlet;
    receiving, by said computing system in response to said second deploying, second monitor data associated with said first resource consumed by said first portlet/servlet during said second deploying, wherein said second monitor data comprises said first resource consumption rate value for said first portlet/servlet during said second deploying;
    comparing, by said computing system in response to said receiving said second monitor data, said first resource consumption rate value to said second resource consumption rate limit value; and
    second determining, by said computing system based on said comparing said first resource consumption rate value to said second resource consumption rate limit value, if said first resource consumption rate value exceeds said second resource consumption rate limit value.

2. The method of claim 1, wherein said second determining determines that said first resource consumption rate value exceeds said second resource consumption rate limit value, and wherein said method further comprises:
    executing, by said computing system in response to said second determining, said second action, wherein said executing said second action comprises disabling said first portlet/servlet.

3. The method of claim 1, further comprising:
    receiving, by said computing system from said administrator in response to said warning message, a command for disabling said first portlet/servlet.

4. The method of claim 1, wherein said portlet/servlet is a servlet.

5. The method of claim 1, wherein said portlet/servlet is a portlet.

6. The method of claim 1, further comprising:
third deploying, by said computing system, a second portlet/servlet, wherein said second portlet/servlet differs from said first portlet/servlet;
receiving, by said computing system from said second portlet/servlet in response to said third deploying, a third resource consumption rate limit value for said second portlet/servlet and third action data associated with said third resource consumption rate limit value, wherein said third action data comprises a third action to be executed if said first resource consumption rate limit value is exceeded and said third resource consumption rate limit value is exceeded;
receiving, by said computing system in response to said third deploying, third monitor data associated with said first resource consumed by said second portlet/servlet during said third deploying, wherein said third monitor data comprises a first resource consumption rate value for said second portlet/servlet during said third deploying;
comparing, by said computing system in response to said receiving said third monitor data, said first resource consumption rate value to said third resource consumption rate limit value; and
third determining, by said computing system based on said comparing said first resource consumption rate value to said third resource consumption rate limit value, if said first resource consumption rate value exceeds said third resource consumption rate limit value.

7. The method of claim 6, wherein said third determining determines that said first resource consumption rate value exceeds said third resource consumption rate limit value, and wherein said method further comprises:
executing, by said computing system in response to said first determining and said third determining, said third action, wherein said executing said third action comprises disabling said first portlet/servlet and said second portlet/servlet.

8. The method of claim 1, further comprising:
receiving, by said computing system from said first portlet/servlet in response to said first deploying, a first specified percentage value of said resource consumption rate limit value and third action data comprising a third action to be executed if said first specified percentage value is exceeded by said resource consumption rate value;
comparing, by said computing system in response to said receiving said first monitor data, said first specified percentage value to said resource consumption rate value; and
third determining, by said computing system based on said comparing said first specified percentage value to said resource consumption rate value, if said first specified percentage value exceeds said resource consumption rate value.

9. The method of claim 8, wherein said third determining determines that said first specified percentage value exceeds said resource consumption rate value, and wherein said method further comprises:
executing, by said computing system in response to said third determining, said third action, wherein said executing said third action comprises disabling said first portlet/servlet.

10. The method of claim 1, further comprising:
receiving, by said computing system from said first portlet/servlet in response to said first deploying, a third resource consumption rate limit value for said first portlet/servlet and third action data comprising a third action to be executed if said resource consumption rate value is less than said third resource consumption rate limit value;
comparing, by said computing system, said resource consumption rate value to said third resource consumption rate limit value; and
third determining, by said computing system based on said resource consumption rate value to said third resource consumption rate limit value, if said resource consumption rate value is less than said second resource consumption rate limit value.

11. The method of claim 10, wherein said third determining determines that said resource consumption rate value is less than said third resource consumption rate limit value, and wherein said method further comprises:
executing, by said computing system in response to said third determining, said third action, wherein said executing said third action comprises generating a message indicating a percentage difference between said resource consumption rate value and said third resource consumption rate limit value; and
transmitting, by said computing system, said message to an administrator.

12. The method of claim 1, further comprising:
calculating, by an estimating component within said computing system, an estimated resource consumption load value, wherein said calculating said estimated resource consumption load value is based on said first resource consumption rate limit value and a current resource consumption load value.

13. The method of claim 12, further comprising:
comparing, by said computing system, said estimated resource consumption load value to a current resource consumption capabilities value.

14. The method of claim 13, further comprising:
determining, by said computing system based on results of said comparing said estimated resource consumption load value to said current resource consumption capabilities value, that said estimated resource consumption load value exceeds said current resource consumption capabilities value; and
uninstalling, by said computing system, said first portlet/servlet.

15. The method of claim 13, further comprising:
determining, by said computing system based on results of said comparing said estimated resource consumption load value to said current resource consumption capabilities value, that said estimated resource consumption load value exceeds said current resource consumption capabilities value;
receiving, by said computing system from an administrator, a command for adjusting said first resource consumption rate limit value;
generating, by said computing system in response to said command, a third resource consumption rate limit value from said first resource consumption rate limit value, wherein said third resource consumption rate limit value exceeds said first resource consumption rate limit value; and
maintaining, by said computing system in response to said third resource consumption rate limit value, said first deploying.

16. The method of claim 1, wherein said first portlet/servlet is deployed to a staging environment.

17. The method of claim 1, wherein said first resource consumption rate limit value comprises a memory limit value.

18. The method of claim 1, further comprising:
providing a process for supporting computer infrastructure, said process comprising providing at least one support service for at least one of creating, integrating, hosting, maintaining, and deploying computer-readable code in a computing system, wherein the code in combination with the computing system is capable of performing: said first deploying, said receiving said first resource consumption rate limit value, said receiving said first monitor data, said comparing said resource consumption rate value, said first determining, said storing, said executing, said receiving said second resource consumption rate limit value and second action data, said disabling, said replacing, said second deploying, said receiving said second monitor data, said comparing said first resource consumption rate value, and said second determining.

19. A computer program product, comprising a computer readable storage medium having a computer readable program code embodied therein, said computer readable program code comprising an algorithm that when executed by a computer processor of a computing apparatus implements a method comprising:
first deploying, by a computing system, a first portlet/servlet;
receiving, by said computing system from said first portlet/servlet in response to said first deploying, a first resource consumption rate limit value for said first portlet/servlet and first action data associated with said first resource consumption rate limit value, wherein said first action data comprises a first action to be executed if said first resource consumption rate limit value is exceeded;
receiving, by said computing system in response to said first deploying, first monitor data associated with a first resource consumed by said first portlet/servlet during said first deploying, wherein said first monitor data comprises a resource consumption rate value for said first portlet/servlet during said first deploying;
comparing, by said computing system in response to said receiving said first monitor data, said resource consumption rate value to said first resource consumption rate limit value;
first determining, by said computing system based on said comparing said resource consumption rate value to said first resource consumption rate limit value, that said resource consumption rate value exceeds said first resource consumption rate limit value; and
storing, by said computing system, results of said first determining;
executing, by said computing system, said first action, wherein said executing said first action comprises transmitting a warning message to an administrator, and wherein said warning message indicates that said resource consumption rate value exceeds said first resource consumption rate limit value;
receiving, by said computing system from said administrator in response to said warning message, a second resource consumption rate limit value and second action data, wherein said second resource consumption rate limit value is greater than said first resource consumption rate limit value and said resource consumption rate value, and wherein said second action data comprises a second action to be executed if said second resource consumption rate limit value is exceeded by a first resource consumption rate value for said first portlet/servlet during said second deploying;
disabling, by said computing system, said first portlet/servlet;
replacing, by said computing system, said first resource consumption rate limit value with said second resource consumption rate limit value;
second deploying, by said computing system in response to said replacing, said first portlet/servlet;
receiving, by said computing system in response to said second deploying, second monitor data associated with said first resource consumed by said first portlet/servlet during said second deploying, wherein said second monitor data comprises said first resource consumption rate value for said first portlet/servlet during said second deploying;
comparing, by said computing system in response to said receiving said second monitor data, said first resource consumption rate value to said second resource consumption rate limit value; and
second determining, by said computing system based on said comparing said first resource consumption rate value to said second resource consumption rate limit value, if said first resource consumption rate value exceeds said second resource consumption rate limit value.

20. A computing system comprising a computer processor coupled to a computer-readable memory unit, said memory unit comprising instructions that when executed by the computer processor implements a method comprising:
resource consumption control execution method comprising:
first deploying, by a computing system, a first portlet/servlet;
receiving, by said computing system from said first portlet/servlet in response to said first deploying, a first resource consumption rate limit value for said first portlet/servlet and first action data associated with said first resource consumption rate limit value, wherein said first action data comprises a first action to be executed if said first resource consumption rate limit value is exceeded;
receiving, by said computing system in response to said first deploying, first monitor data associated with a first resource consumed by said first portlet/servlet during said first deploying, wherein said first monitor data comprises a resource consumption rate value for said first portlet/servlet during said first deploying;
comparing, by said computing system in response to said receiving said first monitor data, said resource consumption rate value to said first resource consumption rate limit value;
first determining, by said computing system based on said comparing said resource consumption rate value to said first resource consumption rate limit value, that said resource consumption rate value exceeds said first resource consumption rate limit value; and
storing, by said computing system, results of said first determining;
executing, by said computing system, said first action, wherein said executing said first action comprises transmitting a warning message to an administrator, and wherein said warning message indicates that said resource consumption rate value exceeds said first resource consumption rate limit value;

receiving, by said computing system from said administrator in response to said warning message, a second resource consumption rate limit value and second action data, wherein said second resource consumption rate limit value is greater than said first resource consumption rate limit value and said resource consumption rate value, and wherein said second action data comprises a second action to be executed if said second resource consumption rate limit value is exceeded by a first resource consumption rate value for said first portlet/servlet during said second deploying;

disabling, by said computing system, said first portlet/servlet;

replacing, by said computing system, said first resource consumption rate limit value with said second resource consumption rate limit value;

second deploying, by said computing system in response to said replacing, said first portlet/servlet;

receiving, by said computing system in response to said second deploying, second monitor data associated with said first resource consumed by said first portlet/servlet during said second deploying, wherein said second monitor data comprises said first resource consumption rate value for said first portlet/servlet during said second deploying;

comparing, by said computing system in response to said receiving said second monitor data, said first resource consumption rate value to said second resource consumption rate limit value; and second determining, by said computing system based on said comparing said first resource consumption rate value to said second resource consumption rate limit value, if said first resource consumption rate value exceeds said second resource consumption rate limit value.

* * * * *